April 8, 1952      J. GERBE      2,592,268
CUTTING DEVICE FOR MOVING STRIP
Filed July 2, 1949      3 Sheets-Sheet 2
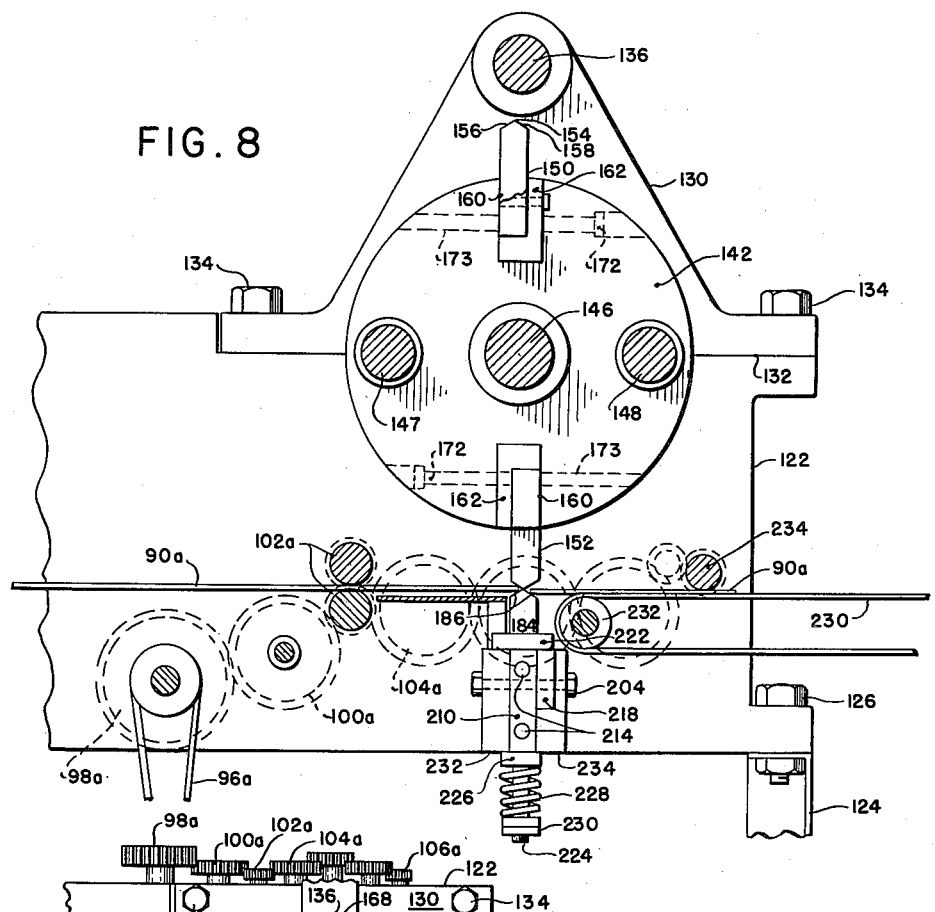
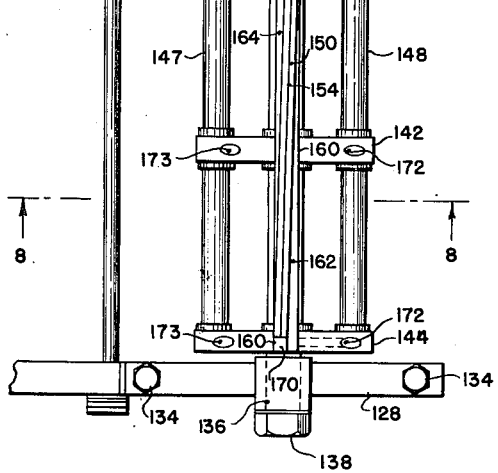
INVENTOR.
Jack Gerbe
BY
ATTORNEY April 8, 1952 J. GERBE 2,592,268
CUTTING DEVICE FOR MOVING STRIP
Filed July 2, 1949 3 Sheets-Sheet 3
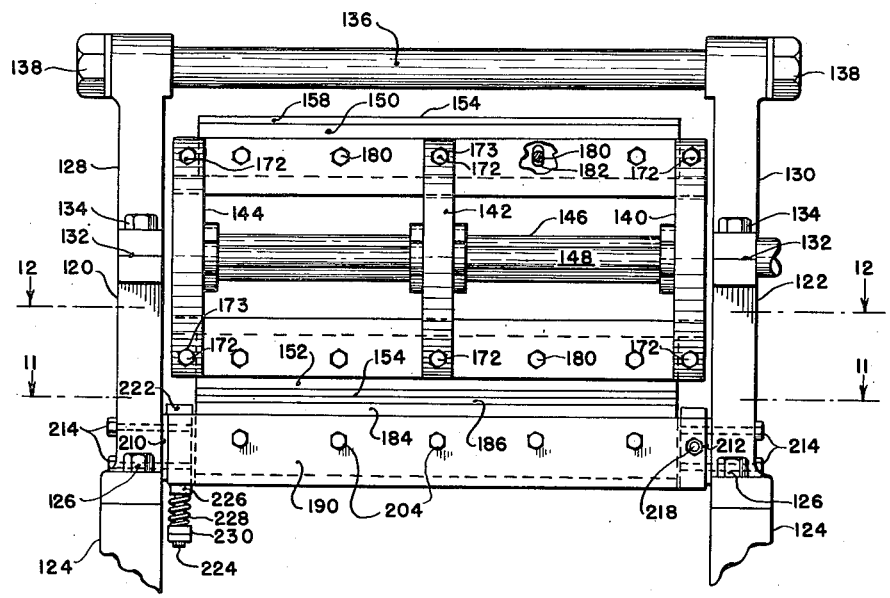
FIG. 10
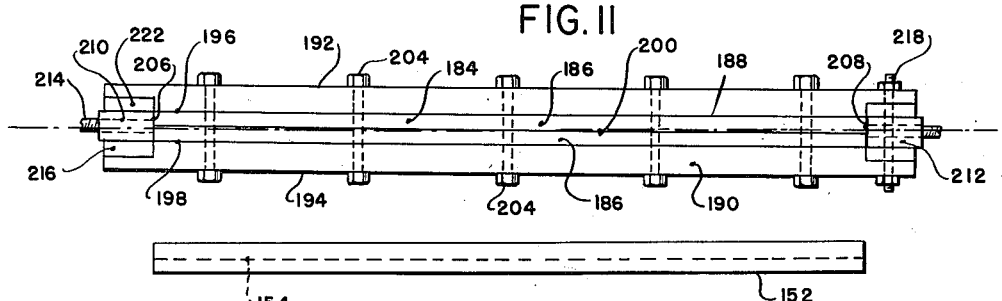
FIG. 11
FIG. 12
INVENTOR.
Jack Gerbe
BY
ATTORNEY Patented Apr. 8, 1952

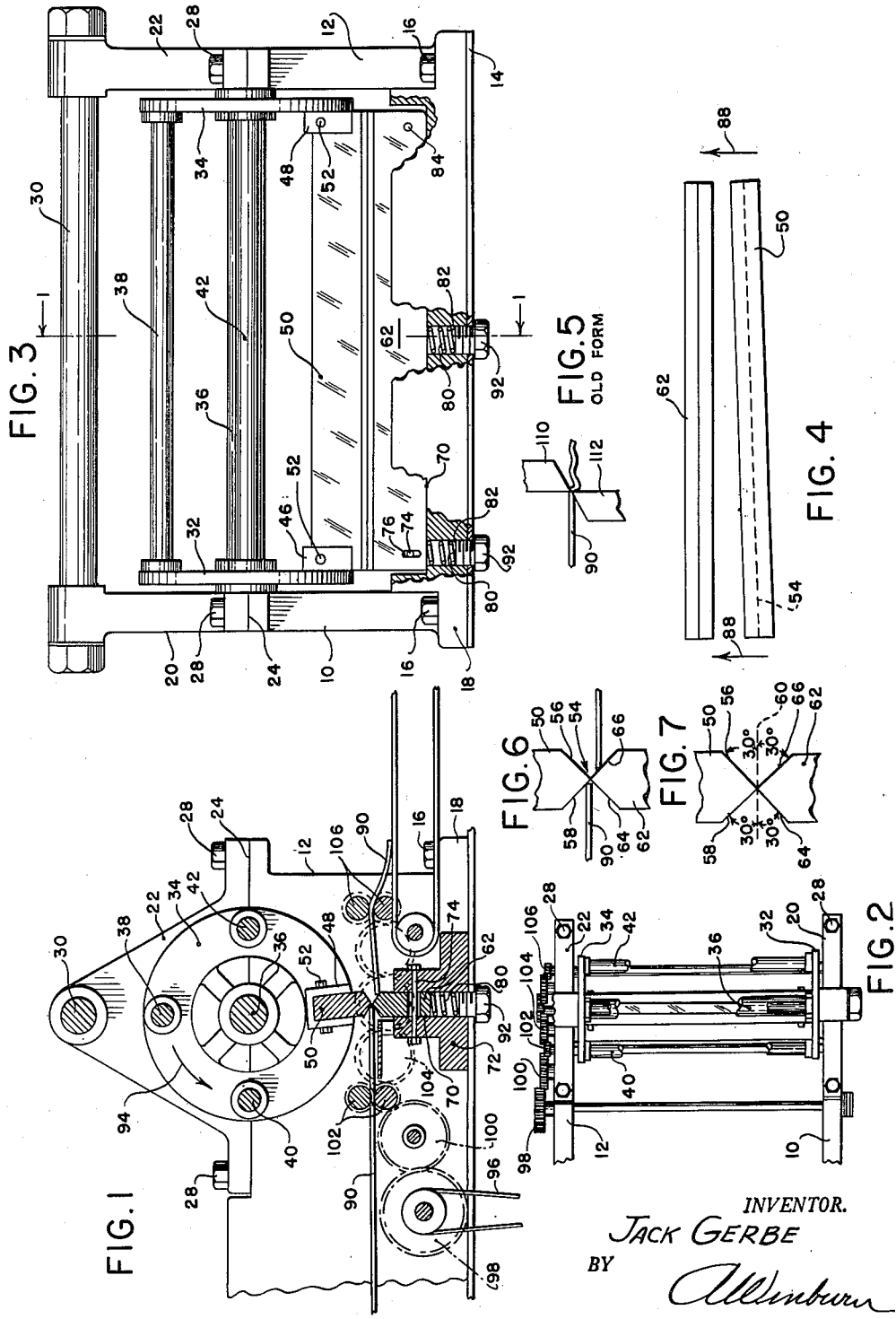

2,592,268

UNITED STATES PATENT OFFICE 2,592,268

CUTTING DEVICE FOR MOVING STRIP

Jack Gerbe, New York, N. Y., assignor to Comet Envelope & Paper Co., Inc., New York, N. Y., a corporation of New York Application July 2, 1949, Serial No. 102,879

9 Claims. (Cl. 164—68)

1

This invention relates to cutting machines.

An object of the invention is to provide an improved form of cutting device, for use in cutting off predetermined lengths of sheet, strip or otherwise elongated material.

Another object of the invention is to provide an improved cutting machine including a pair of cutting knives one of which rotates with respect to the other as another length of material to be cut is drawn through the machine, the cutting knives being of novel and improved consruction in respect of their cutting edges, so that the material being cut is not pushed or wrinkled up by the cutting knives.

A further object of the invention is to provide an improved cutting machine including a pair of coacting knives of novel construction, the knives being slightly angularly inclined relative to each other to provide a scissors-like cutting action rather than cutting simultaneously along all points of the cutting edges.

Still another object of the invention is to provide an improved cutting machine of the type described which is adapted to cut at a higher speed than heretofore, and without interfering with the material being cut, or affecting the smoothness thereof.

Another object of the invention is to provide an improved cutting machine including a pair of cutting knives mounted on a rotatable frame, and angularly spaced from each other, and a stationary frame carrying a third knife, said rotatable frame being adapted to carry each of said pair of cutting knives alternately into cutting position relative to said third knife, and including novel means for mounting said knives.

A further object of the invention is to provide an improved cutting machine which is simple in design, inexpensive to manufacture, and highly effective for its intended purpose.

Other objects and advantages of the invention will become apparent from the following description of a preferred embodiment thereof as illustrated in the accompanying drawings, and in which Fig. 1 is an elevational view in fragment of the cutting machine, taken in section on plane 1—1 of Fig. 3;

Fig. 2 is a top plan view in fragment of the machine shown in Fig. 1;

Fig. 3 is a right end elevation of the machine shown in Fig. 1, portions of the view being broken out into the plane of the lower knife, to illustrate the construction;

Fig. 4 is a detail plan view of the movable and stationary knives only, showing the angle between their respective axes, as seen just before the cutting engagement of said knives;

Fig. 5 is a fragmentary elevational detail view of prior art cutting knives in the process of cutting off material;

Fig. 6 is a fragmentary elevational detail view of the novel cutting knives of this invention, in the process of cutting off material;

2

Fig. 7 is an end elevational view of a cutting knife edge of either cutting knife of this invention, showing the angular relationship of the sides of the cutting edge;

Fig. 8 is an elevational view in fragment of a modified form of the cutting machine, taken in section on plane 8—8 of Fig. 9;

Fig. 9 is a top plan view in fragment of the modified form of cutting machine shown in Fig. 8, portions being cut away to illustrate the construction;

Fig. 10 is a right end elevation of the modified form of cutting machine shown in Fig. 8, partly broken out to show the construction;

Fig. 11 is a plan view taken on plane 11—11 of Fig. 10, looking downward upon the lower knife blade and its holding members, the remaining structure being omitted for clarity; and Fig. 12 is a plan view taken on plane 12—12 of Fig. 10, looking downward upon the upper cutting blade then in cutting position.

In prior art cutting machines, such as are used for cutting off lengths of sheet material or otherwise elongated material, for example, cellophane for making bags, it has been found that the angles of the edges forming the cutting knives caused the cut material to wrinkle along the edge of the mtaerial which had just been cut off, and it is apparent that in cutting such light material as cellophane, which is very thin, like paper, these wrinkled edges are not commercially usable in bag-making, and hence further processing is required. Also, to avoid to some degree such interference with the cut material, it has in the prior art been necessary to run the cutting machine at a very low speed, so that the output of the machine was so small as to vastly increase the cost of the process. My invention presents a solution to this problem, improving the construction and arrangement of the cutting knives, so that there is no wrinkling of the cut material, and higher speeds of the cutting machine may be employed while making perfect cuts.

In order to understand clearly the nature of the invention and the best means for carrying it out, reference may now be had to the drawings, in which like numerals denote similar parts throughout the several views.

The cutting machine includes a frame with upstanding side walls 10 and 12 interconnected at the bottom by a base plate 14 which may be cast integral with the side walls if desired. The machine is secured to a table surface by means of bolts 16 passing through openings in the lugs 18. The height of the side walls is extended by means of side wall extension members 20 and 22 which are jointed to the upper portions of the side walls along line 24, and secured in position by means of bolts or screws 28. A cross bar 30 interconnects the upper ends of the two wall extension members 20 and 22, as seen best in Fig. 3 and holds them securely in position.

A pair of rotating wheels 32 and 34 are mounted on and rotatable with the driven shaft 36 which is journaled in bearings formed in the side walls and wall extension members 20 and 22, centered on the line 24. The rotating wheels 32 and 34 are interconnected by three longitudinal tie rods 38, 40 and 42, spaced ninety degrees apart as seen best in Fig. 1, and in the bottom angular position seen in that view, there are a pair of knife-holding clamps 46 and 48. These clamps are U-shaped as seen in Fig. 1, being welded or otherwise secured to their respective wheels 32 and 34, and are adapted to receive opposite ends of the upper cutting knife 50 which is thus rotatable with the wheels 32 and 34.

Screws or bolts 52 extend through the knife 50 and also the walls of the clamps, to hold the knife securely in position. The upper knife 50 has its cutting edge 54 formed by the intersection of two surfaces 56 and 58 as seen best in Figs. 6 and 7, which each make an angle of between 20 and 40 degrees with the dotted line 60 indicating the horizontal, this angle being preferably about 30 degrees. When this angle is about 30 degrees, then it is seen from Fig. 7 that the included angle between the side edges 56 and 58 is about 120 degrees.

A lower knife 62 also has its cutting edge formed by two surfaces 64 and 66 which similarly each make an angle of between 20 to 40 degrees with the horizontal dotted line 60, preferably about 30 degrees, both knives 62 and 50 being similar in respect of these angles forming their cutting edges. The lower knife 62 is supported in a slot 70 in a lower knife support frame 72 disposed in a hollow space formed in the machine main frame as seen in Fig. 1, being supported therein on bolts 74 extending loosely through a vertical slot 76 formed through leftward end portion of the lower knife as seen in Fig. 3 and through the walls of the knife support frame 72, thus allowing some degree of verical movement of the leftward end of the lower knife as seen in Fig. 3 under the influence of cutting pressure as balanced by the biasing springs 80 to press upwards, the springs being disposed in openings 82 formed in the cradle 72.

At its rightward end in Fig. 3, it is seen that there is no slot formed in the lower knife, but only a hole, 84 to receive a bolt like 74, so that the knife pivots on this right end bolt to a slight degree. Referring now to Fig. 4, it is seen that when viewed in plan, there is a slight angle between the cutting edges of the upper and lower knives 50 and 62, this angle being about one degree, although exaggerated somewhat in the drawing for illustrative purposes only. When the upper knife 50 moves in the direction of the arrows 88, it is seen that the rightward end of the upper knife 50 first contacts the lower knife which is itself parallel to the axis of the shaft 36, and then the rest of the lower knife is contacted gradually, rather than all at once which would happen if the knives were parallel. Thus there is a shearing action on the material 90 being cut, much like that of a scissors, and not suddenly all along both cutting edges simultaneously. This is advantageous.

The springs 80 are held in position by the screws 92 from below as seen in Figs. 1 and 3. The material 90 to be cut off when the upper knife 50 reaches the position shown in Fig. 1, rotating in the direction of the arrow 94, is drawn through from left to right continuously as the upper knife makes one revolution, making the cut each time the upper knife reaches the position of Fig. 1. For this purpose, power is derived through a belt 96 turning a sheave end gear wheel 98 which engages with a gear 100 turning gears on pull rollers 102 above and below the material 90, so as to frictionally engage the same and draw it from left to right. This train of gears is arranged so that it also turns the gear 104 and succeeding gears shown, which finally turn the gears on pull rollers 106 which also frictionally engage the material 90 above and below, to draw it from left to right. The pull rollers 102 and 106 extend across the material above and below so as to engage the same, being driven from the gear train shown at the top of Fig. 2 and mounted on one side for convenience.

Under the prior art, as seen in Fig. 5, with the angles of the cutting edges of the upper and lower cutting knives 110 and 112, the cut material 90 on the right of the cutting knives would wrinkle up as seen in that view. However, it is seen by looking at Fig. 6, that the improved cutting knives 50 and 62, with their novel inclined cutting edges and surfaces as shown, allow the cut material on the right side of the cutting knives to fall away gradually without being wrinkled up. In addition, it is possible to speed up the cutting machine considerably, with greater capacity per machine.

A modified form of the invention is shown in Figs. 8, 9, 10, 11 and 12. This modified form of cutting machine includes a frame with upstanding side walls 120 and 122, which are mutually spaced and carried upon brackets 124 or other supports, being secured thereto by bolts 126. There are several such brackets 124, not illustrated, which carry the leftward portion of the machine shown in Fig. 8.

The height of the side walls is extended by means of side wall extension members 128 and 130 which are joined to the upper portions of the side walls along line 132, and secured in position by means of bolts or screws 134. A cross bar 136 interconnects the upper ends of the two wall extension members 128 and 130, as seen best in Fig. 10, with its two ends extending through openings formed in said extension members and held in position by nuts 138 threaded thereon.

Three rotating wheels 140, 142 and 144 are mounted in and rotatable with the driven shaft 146 which is journaled in bearings formed in the side walls and wall extension members 128 and 130 and centered on the line 132. The rotating wheels 140, 142 and 144 are interconnected by two longitudinal tie rods 147 and 148, spaced 180 degrees apart, as seen best in Fig. 8, the tie rods extending through the corresponding openings formed in the rotating wheels. Two cutting knives 150 and 152 are shown, and have cutting edges 154 formed by the intersection of their cutting edge surfaces 156 and 158, corresponding to the angularity shown in Figs. 6 and 7 with regard to the first embodiment of this invention. That is to say, the cutting knife 50 of Figs. 6 and 7 corresponds to the cutting knives 150 and 152 shown in Figs. 8 through 12, insofar as the angularity of its cutting surfaces is concerned, this being an important feature of the invention.

It is thus seen that the cutting knives 150 and 152 are spaced by 180 degrees and face in opposite directions. As illustrated, radial slots 160 are cut into the perimeters of the three rotatable wheels 140, 142 and 144, to receive the bodies of the cutting knives 150 and 152, and it is seen from Fig. 9 that these slots are enlarged to receive shims 162 and 164 which are of graduated thickness from one end of the knife blade to the other. The purpose of these shims is to dispose the cutting edge of the knife blade at an angle of about one degree with respect to the axis of the shaft 146, so that the knife blade which is movable relative to the relatively stationary blade which is to be described later, will be also canted with respect to the cutting edge of that blade, upon reaching cutting engagement therewith. The purpose of this angularity between the cutting blades has already been explained above, and will not be further mentioned in detail, except to say that it gives a progressive scissors-like action rather than the less efficient instantaneous meeting of the entire lengths of the two cutting edges.

As seen best in Fig. 9, the ends of the cutting knives do not extend all the way to the outer edges of the rotatable wheels 140 and 144, and filler blocks 168 and 170 are inserted into these spaces, the filler blocks having one surface parallel to the opposite surfaces of the slots 160 and the other surface parallel to the inner surface of the tapered shims 164 and 162 at that location, so as to bring the outer surfaces of the contents of each slot into parallelism therewith to insure good fit. Screws 172 extend through chordal openings 173 in the perimeters of the rotatable wheels 140, 142 and 144, so as to extend through each slot and its contents, being threaded into such chordal openings so as to hold these parts securely against dislodgment.

The slots 160 in the rotatable wheels are slightly deeper than the depth of the knives 150 and 152, and, as seen in Fig. 10, all screws 172 and 180 which extend through the knives actually extend through vertically elongated slots 182 formed in the knives, so that radial adjustment of the knives is permissible, particularly when they become worn down due to sharpening.

A lower relatively stationary knife 184 having a cutting edge formed by the intersection of surfaces 186 corresponding in angularity to those of the cutting knife 62 of Figs. 6 and 7, is disposed in between two knife holding walls 188 and 190. These walls have their outer surfaces 192 and 194 mutually parallel, and parallel to the axis of the shaft 146, and their inner surfaces 196 and 198 mutually parallel but inclined with respect to the planes of surfaces 192 and 194, that is at an angle to intersect them if extended. Between the spaced inner surfaces 196 and 198 is placed the lower cutting knife 184, and, since its side body surfaces are mutually parallel, the lower cutting knife edge 200 will cross and not mate linearly with a movable knife edge such as 154 of either of the movable cutting knives when they are in cutting position, and hence the cutting action will be scissors-like rather than cutting simultaneously along a line, the angularity being on the order of about one degree between the cutting edges. Figs. 11 and 12 show the relative positions of the stationary and movable cutting knives 152 and 184 just before coming into cutting position, the angularity being slightly exaggerated in the drawings for clarity.

Bolts 204 extend through the assembled holders 188 and 190 and the intervening knife 184, as seen in Figs. 8, 10 and 11, to hold them securely together. Since the knife 184 is not as long as the holders 188 and 190, as seen best in Fig. 11, extending only to lines 206 and 208, cut out portions or slots are thus created to receive the fastening blocks 210 and 212 respectively. These fastening blocks are secured by screws 214 to the side walls 120 and 122 respectively, of the machine frame, so as to be held rigidly in position, though extending into the cut out slots as illustrated.

Filler blocks 216, having non-parallel faces are disposed in the slots alongside the fastening blocks 210 and 212 respectively, to fill out the slots, since the slight non-parallelism due to the angularly incline dinner surfaces of the holders 188 and 190 requires such filler blocks. At the right hand end of Fig. 11, it is seen that the bolt 218 extends right through the entire assembly, including the holders 188 and 190, the fastening block 212 and the filler block 218, so as to form a pivot upon the fastening block 212 about which slight turning motion of the holders and lower cutting knife is possible.

At the left hand end of Figs. 10 and 11, and from Fig. 8, it is seen that there is a boss 222 integral with the upper portion of the left hand fastening block 210, so as to make it T-shaped when viewed in Fig. 8, and this forms a stop limiting upward motion of the left hand end of the cutting knife as seen in Fig. 10 about the pivot pin 218. A screw 224 which is threaded into the lower portion of the fastening block 210, depends therefrom as seen in Figs. 8 and 10, having a collar 226 pressed upwardly by a spring 228 encircling the screw 224, and held in position by the nut 230 threaded onto the screw below the spring. The collar 226 thus presses upwardly yieldingly against the lower surfaces 232 and 234, as seen in Fig. 8, of the knife holders 188 and 190, so as to bias them upwards against the stationary boss 222.

Thus it is seen that the lower knife is free to pivot slightly about the pivot pin 218 at its right hand end as seen in Fig. 10, against the spring bias of the spring 228 at its left hand end. This prevents breaking of the knives or the machine should any slight misalignment exist.

As seen in Figs. 8 and 9, power is derived through a belt 96a to turn gear 98a, which drives gear 100a and gears 102a which drive pulling rollers drawing a sheet of cellophane or the like 90a from left to right as in Fig. 8, to be cut. A carrier belt 230 is movable on wheels 232 so as to carry off to the right the cut portions of cellophane, the driven roller 234 exerting a slight tensile or drawing action on the cellophane toward the right and being operated through a suitable gear train as shown.

Because of the use of two cutting knives on the rotatable wheels instead of only one, as in the first embodiment shown, it is possible to cut off shorter lengths of sheet material 90a if desired, and also greater flexibility is allowed in the arrangement of the cutting with regard to lengths of cut material, and speed of the parts and the material to be cut. Further, due to the special angularity as shown in Figs. 6 and 7, there is no wrinkling up of the cut material and greater efficiency results.

Although I have decribed my invention in specific terms, it is to be understood that variations may be made in size, shape, materials and arrangement without departing from the spirit and scope of the invention as claimed.

I claim:

1. A cutting machine comprising a frame, a lower cutting knife disposed in said frame with its cutting edge uppermost, an upper cutting knife, rotating means for supporting said upper cutting knife in said frame so that once each revolution the upper cutting knife is moved to a cutting position with its cutting edge engaging the cutting edge of the lower cutting knife to cut material disposed therebetween, resilient means providing upward bias on said lower cutting knife, means for moving elongated material through said machine, over said lower cutting knife for being cut off at predetermined lengths, the angle between the upper and lower cutting edges when in cutting position being on the order of about one degree, each of said cutting knives comprising a knife body with mutually parallel longitudinal sides, the cutting edge formed in said knife lying between the planes of said longitudinal sides of said knife body.

2. The construction according to claim 1, characterized further in that said cutting edge of each knife is connected to said longitudinal sides of said knife body by convergent marginal portions, said convergent marginal portions of said body having an included angle therebetween ranging from about between 100 degrees to 140 degrees.

3. The construction according to claim 2, characterized further in that said convergent marginal portions of each cutting knife have an included angle therebetween of about 120 degrees.

4. A cutting machine comprising a frame, a lower cutting knife disposed in said frame with its cutting edge uppermost, said knife being pivoted in said frame at one end portion, and having a slot formed near its opposite end portion, a bolt engaging said frame and extending through said slot, resilient means providing upward bias on said slotted end of said lower cutting knife, an upper cutting knife, rotating means in said frame for carrying said upper cutting knife through a series of complete revolutions in which once each revolution the cutting edge of said upper cutting knife is in engagement with the cutting edge of the said lower cutting knife, said upper cutting knife being so arranged as to be, upon reaching said cutting position, at a slight angle with said lower cutting edge, whereby a scissors-like cutting action on sheet material to be cut is obtained, the said cutting edges of said knives being formed by intersecting margins of the knives making an obtuse angle with each other.

5. A cutting machine comprising a frame, a lower cutting knife disposed in said frame with its cutting edge uppermost, said knife being pivoted in said frame at one end portion, and slidably engaging said frame at its other end portion, stop means carried by said frame and disposed in the path of upward motion of said slidably engaged cutting knife end portion to limit upward motion thereof, resilient means biasing said slidable end portion against said stop means, and yieldable upon exertion of downward force on said cutting knife to allow said knife to pivot in a downward direction, a shaft journaled in said frame, wheels carried on and rotatable with said shaft, at least one second cutting knife carried on said wheels and rotatable therewith, at least one said lower and second cutting knife being so constructed and arranged that, when in cutting position, their cutting edges intersect with each other, making a scissors-like cutting contact.

6. The construction according to claim 5, wherein said lower cutting knife comprises a lower cutting knife body having a cutting edge, a pair of spaced cutting knife holders disposed on each side of said cutting knife body with the cutting knife body therebetween, the outer surfaces of said cutting knife holders being mutually parallel, the inner surfaces of said cutting knife holders being mutually parallel but out of parallelism to said outer surfaces thereof, whereby said cutting knife body is disposed with its cutting edge out of parallelism with the said uoter surfaces of said cutting knife holders, means securing said cutting knife holders and cutting knife body together, said assembled holders and body being pivotally engaged at one end with said frame, and slidably engaged at its other end with said frame, with stop means limiting upward motion of said slidably engaged end portion and resilient means biasing said slidably engaged portion toward said stop means.

7. The construction according to claim 6, wherein first and second notches are formed in the opposite ends of said assembled holders and body, and in which first and second fastening blocks are secured to said frame and extend into said first and second notches respectively, said first fastening block pivotally engaging said first notch, and said second fastening block slidably engaging said second notch, said stop means and resilient biasing means being carried by said second fastening block.

8. A cutting machine comprising a frame, a lower cutting knife disposed in said frame with its cutting edge uppermost, said knife being pivoted in said frame at one end and slidably engaging said frame at its second end, stop means carried by said frame and disposed in the upward motion path of said second end of said knife, resilient means biasing said second knife and against said stop means, and yieldable upon application of downward force upon said knife, a shaft journaled in said frame, a plurality of wheels carried by said shaft and rotatable therewith, tie rods interconnecting said wheels, notches cut into portions of said wheels and in longitudinal alignment, a plurality of movable cutting knives each receivable in one plurality of said aligned notches, means in said notches for holding said movable cutting knives therein for rotation with said wheels, for cutting engagement successively with said stationary lower cutting knife, said means in said notches including means for holding said movable knives at an angle with the axis of said shaft.

9. The construction according to claim 8, wherein said last named means comprises a pair of tapered shims engaging at least a pair of said aligned notches with said cutting knife therebetween.

JACK GERBE.

REFERENCES CITED

The following references are of record in the file of this patent:

UNITED STATES PATENTS

| Number | Name | Date |
| --- | --- | --- |
| 35,592 | Dougherty | June 17, 1862 |
| 716,938 | Rust | Dec. 30, 1902 |
| 936,572 | Scott | Oct. 12, 1909 |
| 1,515,377 | White | Nov. 11, 1924 |
| 1,632,378 | Lerner | June 14, 1927 |
| 1,947,399 | Umansky | Feb. 13, 1934 |
| 2,062,737 | Aiken | Dec. 1, 1936 |

FOREIGN PATENTS

| Number | Country | Date |
| --- | --- | --- |
| 21,304 | Great Britain | Oct. 25, 1899 |
| 433,802 | Germany | Sept. 11, 1926 |
| 461,764 | Great Britain | Feb. 24, 1937 |